United States Patent Office 3,773,863
Patented Nov. 20, 1973

3,773,863
UNSATURATED TRICYCLIC SECONDARY PHOSPHORIC ESTERS

Yoshiaki Inamoto, Wakayama, and Takeji Kadono, Kainan, Japan, assignors to Kao Soap Co., Ltd., Tokyo, Japan
No Drawing. Filed June 23, 1971, Ser. No. 156,116
Claims priority, application Japan, June 24, 1970, 45/54,977
Int. Cl. C07f 9/08
U.S. Cl. 260—956                         1 Claim

ABSTRACT OF THE DISCLOSURE

A compound of the formula

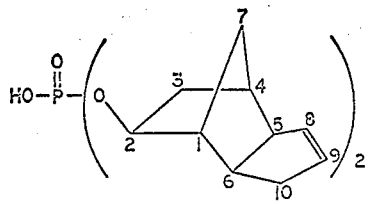

is prepared by reacting endo-dicyclopentadiene with phosphoric acid. The compound is useful as an additive for synthetic lubricants and hydraulic oils.

BACKGROUND OF THE INVENTION

Field of the invention

This invention relates to a process for preparing secondary phosphoric esters having two tricyclic alkenyl radicals. More particularly, it relates to a process for preparing a secondary phosphoric ester of 2-exo-hydroxy-2,3-dihydro-exo-dicyclopentadiene, which ester has the Formula I,

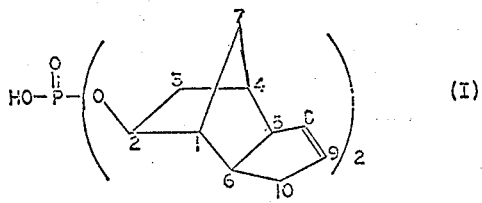

Bis(2,3 - dihydro - exo-dicyclopentadienyl-(2)-exo) hydrogen phosphate having the above structural formula which is produced by the process of the present invention is a novel substance that has not been synthesized before. It is very useful, because it is greatly superior to known phosphoric esters having linear aliphatic or aromatic residues as regards various properties, such as viscosity index, friction coefficient, antioxidant property and the like, when used as an additive for synthetic lubricants and hydraulic oil. It also has many other characteristic advantageous properties that the above-described conventional substances do not possess.

DESCRIPTION OF THE PRIOR ART

Since the properties of the compounds represented by the above-described Formula I are different from those of simple alkyl or cycloalkyl phosphoric esters, it cannot be manufactured by the known conventional process for synthesizing secondary phosphoric esters, for example, the known process consisting of the reaction of an alcohol with phosphorus trichloride to produce dialkyl hydrogen phosphite, which is then treated with chlorine to give dialkyl chlorophosphate, followed by hydrolysis of the dialkyl chlorophosphate to give the desired product (H. McCombie et al., J. Chem. Soc., 1945, 381; N. K. Bliznyuk et al., Zh. Obshch. Khim., 39, 1353 (1967); R. A. McIvor et al., Can. J. Chem. 34, 1819 (1956)). In our attempts to synthesize the compound (I) by the above-described process, the reaction of 2-exo-hydroxy-2,3-dihydro-exo-dicyclopentadiene with phosphorus trichloride proceeded well to produce the desired bis(2,3-dihydro-exo-dicyclopentadienyl-(2)-exo) hydrogen phosphite in a high yield, but in the second reaction, that is, in the reaction of the phosphite with chlorine, a considerable amount of resinous substance was produced, but no desired product was obtained at all.

It is known that various protonic acid (Broensted acid) HX reacts with endo-dicyclopentadiene as shown in the reaction scheme (1)

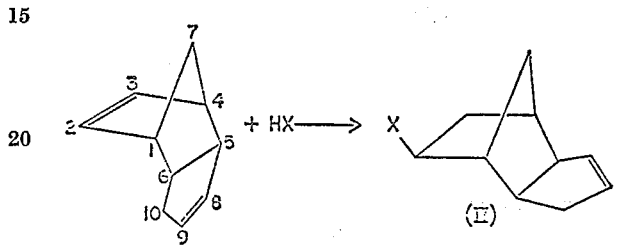

to give 2-exo-substituted 2,3-dihydro-exo-dicyclopentadiene (II), and as such HX there are exemplified hydrogen chloride (H. A. Bruson et al., J. Am. Chem. Soc., 67, 1178 (1945)); P. D. Bartlett et al., ibid., 68, 6 (1946), hydrogen bromide (G. T. Youngblood et al., J. Org. Chem. 21, 1436 (1956)), hydrogen iodide (P. D. Bartlett et al., J. Am. Chem. Soc., 69, 2553 (1947)), and formic acid (F. Bergmann et al., ibid., 69, 1826 (1947)); (S. J. Cristol et al., ibid., 3918 (1962); J. Org. Chem., 33, 106 (1968)). However, it has not been known whether or not phosphoric acid reacts with endo-dicyclopentadiene in the same way as these acids.

DETAILED DESCRIPTION

We have discovered that phosphoric acid also is added to the 2,3-ethylenic bond of endo-dicyclopentadiene and that, although phosphoric acid is tribasic, only two mols of dicyclopentadiene could condense with a molecule of phosphoric acid to produce the compound with the Formula I. The present invention, based on the above findings, provides a novel process for manufacturing bis (2,3 - dihydro - exo-dicyclopentadienyl-(2)-exo) hydrogen phosphate represented by the Formula I by the reaction of endo-dicyclopentadiene with phosphoric acid. The fact that the addition reaction stops at the stage of secondary phosphoric ester is particularly noteworthy, and we consider this is due to the crowdedness around the phosphorus atom caused by the bulky bicyclo[2.2.1]heptane ring systems, which sterically hinder the approach of the third molecule of endo-dicyclopentadiene.

The concentration of phosphoric acid to be employed in the process of this invention is from 10% to 100%, preferably from 50% to 100%; the amount of endo-dicyclopentadiene to be used may be from the stoichiometric amount (2 moles per mole of phosphoric acid) to any excess. When using a phosphoric acid of a concentration less than 10%, the desired compound (I) cannot be produced substantially. The reaction temperature ranges from 0° C. to 150° C., preferably from 30° C. to 100° C. At temperatures lower than 0° C., the reaction does not proceed substantially, and at temperatures higher than 150° C., dicyclopentadiene begins to decompose.

The present invention is illustrated by the following example, wherein the term "parts" refers to parts by weight unless otherwise noted, and all melting points are uncorrected.

EXAMPLE

Two and seventy-seven hundredths (2.77) parts of phosphorus pentoxide were added to 7.03 parts of 85% phosphoric acid and, after the phosphorus pentoxide had been dissolved by heating so that the phosphoric acid had a concentration of about 100%, the mixture was cooled to 55° C. To the solution were added 132 parts of endo-dicyclopentadiene and the resulting mixture was stirred at the same temperature for 13 hours. The reaction mixture was allowed to cool and then was washed twice, each time with 200 parts by volume of water. The reaction mixture was then mixed with 300 parts by volume of fresh water, and was neutralized to pH 7-8 by the addition of 5% sodium carbonate solution. The water layer was separated and strongly acidified by adding 5% hydrochloric acid. The separated oil layer was collected and the aqueous layer was extracted with ether. The combined organic layer and ether extract was washed with water and dried in anhydrous sodium sulfate. Ether was distilled off from the solution over a water bath under a reduced pressure to give 18.3 parts (yield 51%) of viscous, pale brown liquid of crude product (I). The crude product was recrystallized from petroleum benzine to give colorless platelets having a melting point of 132° C.

Acid value:
 Found: 153.8.
 Calculated for $C_{20}H_{27}O_4P$ (monobasic acid): 155.0.
Analysis:
 Found (percent): C, 66.8; H, 7.7; P, 8.3.
 Calculated for $C_{20}H_{27}O_4P$ (percent): C, 66.28; H, 7.51; P, 8.55.
IR spectrum (cm.$^{-1}$, KBr tablet):
 3050 (m.): $\nu$C—H (C=C—H)
 2600 (m.):

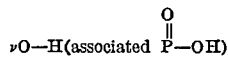
 $\nu$O—H(associated P—OH)

1465 (m.), 1450 (m.), 1380 (m.): $\delta$C—H (CH$_2$, CH)
 1240 (s.):

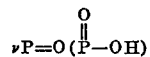
 $\nu$P=O(P—OH)

1020 (vs.):

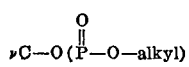
 $\nu$C—O(P—O—alkyl)

800 (m.), 700 (m.): $\delta$C—H (out-of-plane)

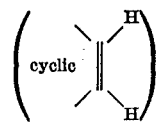

NMR spectrum ($\tau$, CCl$_4$ solution):
 4.34–4.54 (AB-type quartet, $\tau$=6 Hz., 4H):

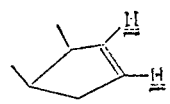

545–5.90 (undissolved resonance, 2H):

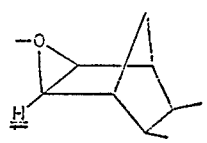

7.2–8.8 (complex multiplet, 24H): other H's.

The above-described properties of the compound agree with the structure represented by the Formula I.

The embodiments of the invention in which an exclusive property or privilege is claimed are defined as follows:
 1. A compound of the formula

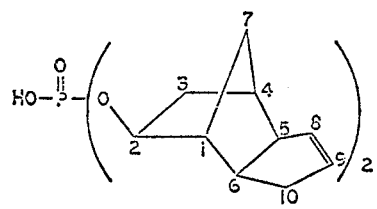

References Cited

Bruson: Journal of the American Chemical Society, vol. 67 (1945), pp. 1178–1180.

Bartlett et al.: Journal of the American Chemical Society, vol. 68 (1946), pp. 6–8.

Cristol et al.: Journal of the American Chemical Society, vol. 84 (1962), pp. 3918–3925.

Kosolapoff: Organophosphorus Compounds, John Wiley & Sons, Inc., New York, 1950, p. 230.

LEWIS GOTTS, Primary Examiner

R. L. RAYMOND, Assistant Examiner

U.S. Cl. X.R.
252—49.8; 260—978